Oct. 6, 1959
F. H. MUELLER
2,907,229
DRIVE FOR DRILLING MACHINE
Filed Dec. 1, 1958
3 Sheets-Sheet 1
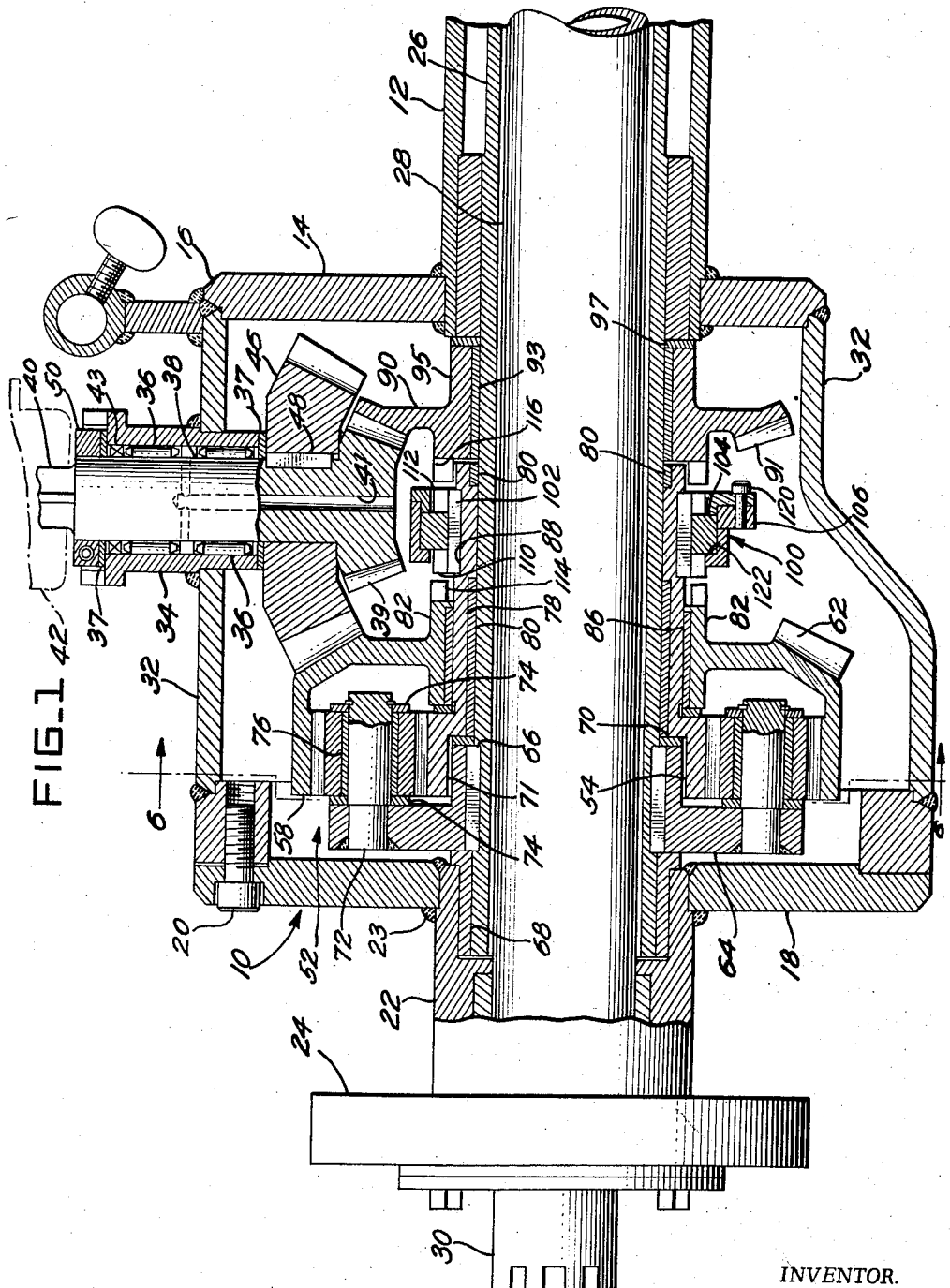
INVENTOR.
FRANK H. MUELLER
BY
Cushman, Darby & Cushman
ATTORNEYS Oct. 6, 1959

F. H. MUELLER 2,907,229

DRIVE FOR DRILLING MACHINE

Filed Dec. 1, 1958

INVENTOR
FRANK H. MUELLER

BY Cushman, Darby & Cushman
ATTORNEYS

Oct. 6, 1959 F. H. MUELLER 2,907,229
DRIVE FOR DRILLING MACHINE
Filed Dec. 1, 1958 3 Sheets-Sheet 3
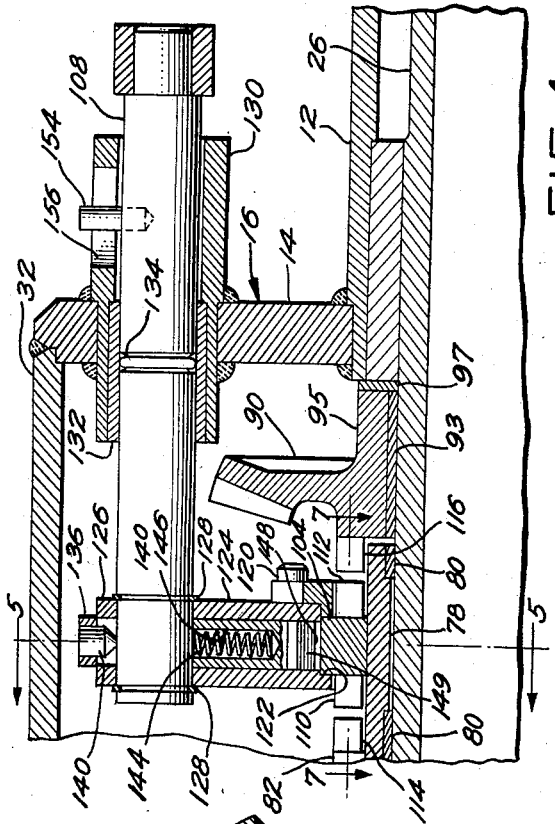
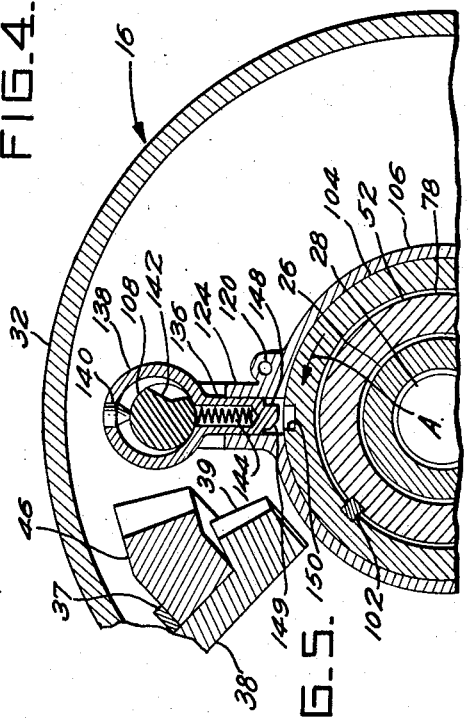
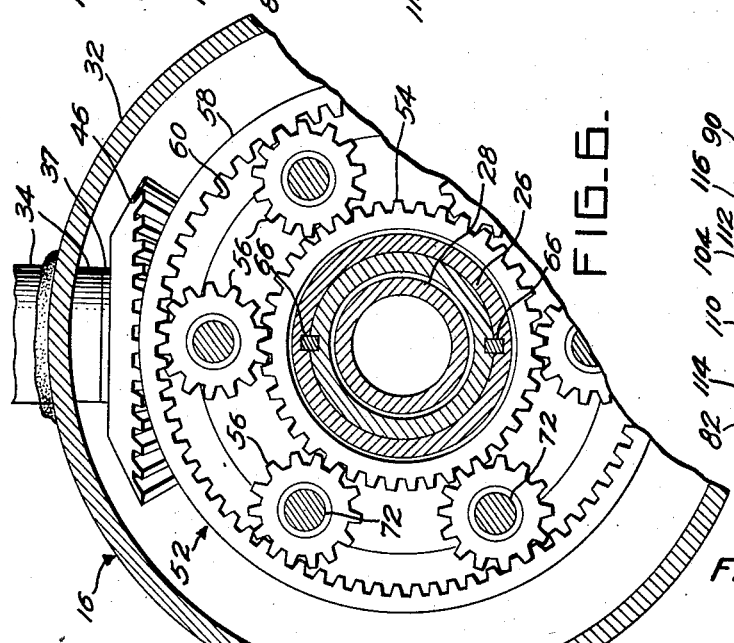
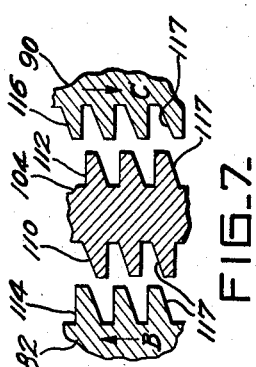
INVENTOR
FRANK H. MUELLER
BY Cushman, Darby & Cushman
ATTORNEYS United States Patent Office 2,907,229
Patented Oct. 6, 1959

2,907,229

DRIVE FOR DRILLING MACHINE

Frank H. Mueller, Decatur, Ill., assignor to Mueller Co., Decatur, Ill., a corporation of Illinois Application December 1, 1958, Serial No. 777,360

19 Claims. (Cl. 74—674)

The present invention relates to machines for drilling or tapping mains and pipes without the escape of fluid pressure therefrom, such machines being generally of the type disclosed in United States Patent Nos. 1,956,129, 2,470,-044, and 2,646,699. More particularly, the present invention is an improvement in the means for driving such drilling machines and is an improvement of the drive disclosed in my copending United States application, Serial No. 691,836, filed October 23, 1957, now Patent Number 2,884,808.

Drilling machines of the type disclosed in the aforementioned patents are provided with a pressure-tight housing completely enclosing a boring or drilling bar that is usually driven by power but may be driven by hand. A drive tube coaxial with the boring bar is usually connected to a suitable source of power and the rotation of the drive tube, which is operatively coupled to the boring bar by a feed mechanism imparts axial and rotary movement to the boring bar. The feed mechanism is provided with a clutch device which, upon its disengagement, permits hand advance of the boring bar by rotation of a crank handle connected directly to the feed mechanism. Means are usually provided on the drilling machines of the types under consideration, for determining the axial position of the boring bar at all times, so that the operator can have the machine under complete control throughout the boring operation.

In the means for driving the drilling machine of the type under consideration by power, a constant speed and torque was applied to the drive tube by a direct connection between the drive tube and the source of power. In present-day operation, where different size mains and mains made of various materials require different drilling tools for use with the boring bar, it has been found desirable to provide a varied speed and torque to the boring bar. Accordingly, the present invention relates to improvements in such a drive for drilling machine as shown in my aforementioned Patent Number 2,884,808, the present drive providing means to vary the speed and torque of the boring or drilling bar so as to accommodate various load conditions encountered in present day operation.

An object of the present invention is to provide a drilling machine with a transmission for imparting variable speed to the drilling bar and the tool carried thereby.

Still another object of the present invention is to provide a drilling machine utilizing a variable speed transmission which will effect a three-speed change to the rotation and advancement of the boring bar.

Another object of the present invention is utilizing a speed transmission capable of providing a three-speed change in rotation and/or advancement of the boring bar, the transmission also being provided with a neutral drive position when it is desired to stop operation of the boring bar without stopping operation of the prime mover.

A still further object of the present invention is to provide a simple and compact transmission for a drilling machine, the transmission being easily operable to change the speed and torque of the drilling or boring bar of the drilling machine.

Another object of the present invention is to provide a drilling machine with a planetary transmission which is capable of varying the speed and torque of the boring bar of the machine, the transmission being compact and efficient.

A further object of the present invention is to provide a planetary transmission wherein the sun and ring gears are continuously in engagement with the planetary gears yet a speed change is effected by varying the rotational movement of the sun and ring gears with respect to each other.

Still another object of the present invention is to provide a planetary transmission which is capable of varying the speed and torque of the boring bar of the drilling machine, the transmission having no sliding bevel gears for movement into and out of mesh. It has been found that the movement of bevel gears into and out of mesh are undesirable, as bevel gears have large end thrust and such construction necessitates positive means to lock the gears against unmeshing movements.

Ancillary to the above object, it is an object of the present invention to provide a planetary transmission having drive means for varying the speed and torque, the means being so designed and arranged that it is unnecessary to provide positive locking means for various changes of speed and torque.

These and other objects of the present invention will appear more fully in the following specification, claims and drawings, in which:

Figure 1 is a fragmentary view of a drilling machine, partly in elevation and partly in section, showing the embodiment of the transmission of the present invention.

Figure 4 is a sectional view taken on the line 4—4 of Figure 2.

Figure 5 is a sectional view taken on the line 5—5 of Figure 4, and

Figure 6 is a sectional view taken on the line 6—6 of Figure 1.

Figure 7 is a fragmentary sectional view taken on the line 7—7 of Figure 4.

Figures 2, 3:
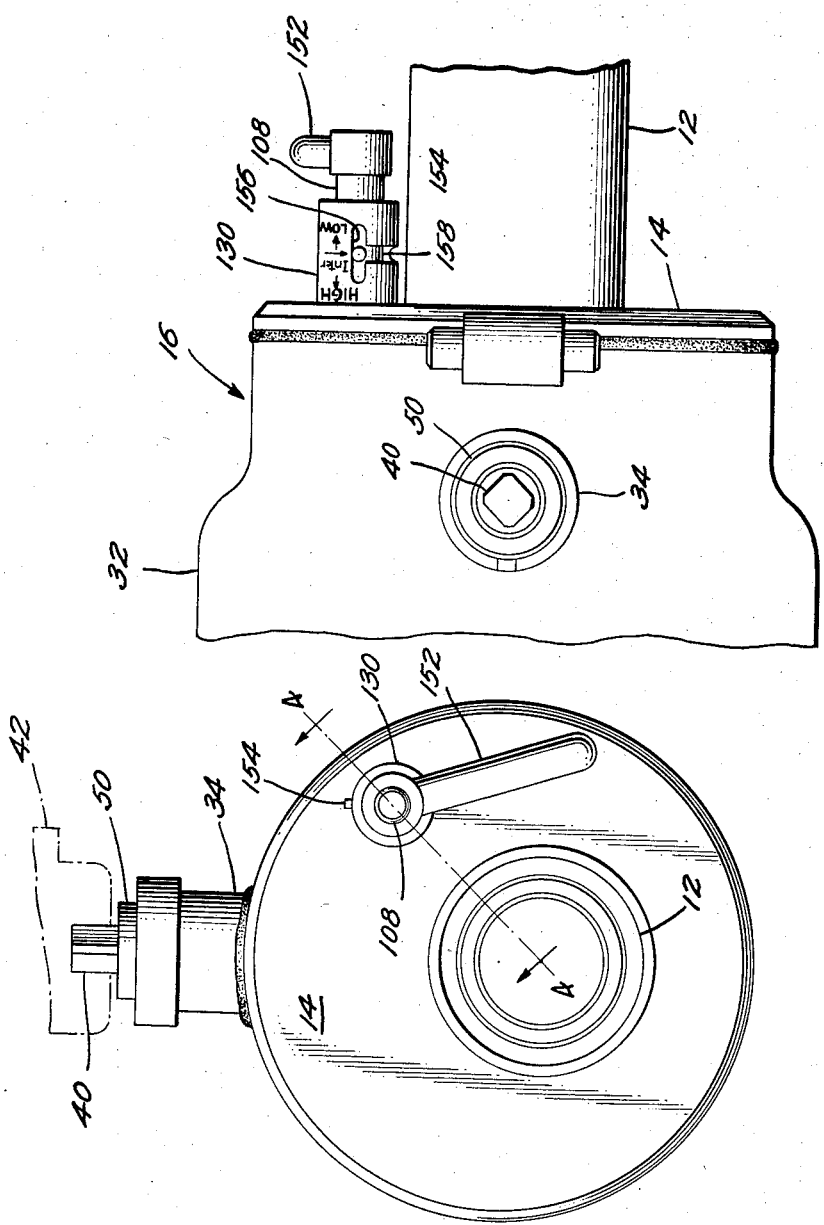
Figure 2 is an end view of the drilling machine shown in Figure 1 and looking from the right to the left of Figure 1.
Figure 3 is a fragmentary plan view of the drilling machine of Figure 1 and showing the facing lever for varying the speed of the drilling bar.

Referring now to the drawings, wherein like characters or reference numerals represent like or similar parts, the drilling machine, generally designated by the numeral 10, is of the type disclosed in the aforementioned United States Patent Nos. 1,956,129, 2,470,044 and 2,646,699, and includes a barrel 12 provided with a bottom flange 14 forming the top wall of a lower gear housing, generally designated by the numeral 16. The housing 16 has a removable lower wall 18 bolted thereto by means of machine screws or studs 20. A tubular extension 22, provided with a flange 24 at its extremity, is welded to the lower wall 18, as indicated at 23, in axial alignment with the barrel 12. Flange 24 is adapted to be bolted in the usual manner to one end of a valve (not shown) attached to the main or pipe to be drilled. The bit of the drilling machine passes through the valve into engagement with the wall of the pipe or main.

The upper end of barrel 12 (not shown) is of the usual type disclosed in the aforementioned Patents Nos. 1,956,129, 2,470,044 and 2,646,699, and includes a feed mechanism for coupling a drive tube 26 with a boring or drilling bar 28, the feed mechanism effecting axial and rotary movement to the latter. As shown in Figure 1, the lower end of the hollow boring bar 28 is provided with jaws 30 to drive a cutting tool (not shown) which may be a shell-type cutter, or the like.

Gear housing 16 is provided in its peripheral wall 32 with a boss 34 having an axis which is substantially radial of the axis of drive tube 26. Roller bearings 36 supported within the bore of boss 34 provide a journal for driving a stub shaft 38 having a beveled pinion gear 39 on its lower end. The upper end of the stub shaft 38 extends out of the housing as indicated at 40 and is adapted to be received in a complementary shaped socket of an air motor 42 shown in dotted lines which drives the same. Suitable thrust washers 37 are provided above and below the bearings 36 and the stub shaft 38 is held in position by means of a lock nut 50. Supported on the stub shaft 38 above the bevel pinion gear 39 and below the 34 is a second bevel gear 46, the bevel gear 46 being keyed to the shaft 38 by a key 48. Suitable oil passages 41 extending axially from the lower end of the shaft 38 to a point intermediate the length and then radially outwardly thereof provide a means of lubrication for the bearings 36. A seal 43 interposed between the upper end of the boss 34 and the shaft 38 prevents the escape of oil from the housing 16.

Disposed within gear housing 16 and adapted to be driven by the driving bevel gear 46 is a planetary transmission mechanism generally designated by the numeral 52 and shown in Figures 1 and 6. The planetary transmission mechanism includes a sun gear 54, planet gears 56 and a ring gear 58. The ring gear 58 is provided with internal teeth 60 which mesh with the planet gears 56 and external teeth 62, which mesh constantly with the teeth of driving bevel gear 46. Planet gears 56 are carried by a planet gear carrier 64 which is fixed on the drive tube 26 by keys 66. A thrust washer 68 interposed between the end of the planet gear carrier 64 and the upper end of the tubular extension 22 prevents axial movement of the gear carrier, as the other end of the gear carrier abuts against a thrust washer 70 provided in a counter bore 71 in the end of the sun gear 54. The planet gears 56 are rotatably supported on stub shafts 72 supported by gear carrier 64, and extending parallel to the axis of the drive tube 26. Suitable thrust bearings 74 are provided on each side of the planet gears 56, whereas a sleeve bearing 76 is interposed between the stub shafts 72 and the planet gears 56 so that they may have free rotation with respect to the gear carrier, as the gear carrier itself is rotated.

The sun gear 54 is rotatably mounted on the drive tube 26 and is provided with an extended hub portion 78. So that there may be free relative rotation between the drive tube 26 and the sun gear 54, sleeve bearings 80 are interposed between the drive tube and the sun gear.

Ring gear 58 is provided with an axially extending hub portion 82 coaxial with and rotatably journaled on the hub portion 78 of sun gear 54. As shown in Figure 1, the hub portion 82 of ring gear 58 is integrally formed on the main body portion of the ring gear and a sleeve bearing 86 is interposed between the hub 82 and the hub 78 so as to provide for free relative rotation between the sun gear 54 and the ring gear 58.

Spaced axially from ring gear 58 and journaled on the drive tube 26 is a bevel gear 90 having teeth 91 which are constantly in mesh with the teeth of the bevel pinion gear 39. In more detail, bevel gear 90 is rotatably mounted on the shaft 26 by providing a bearing 93 between the hub 95 of bevel gear 90 and the shaft 26. A thrust washer 97 provided on the shaft 26 and between the hub 95 of bevel gear 90 and the end of the barrel 12 prevents axial movement of the gear 90 in an unmeshing direction.

As is now evident rotation of the stub shaft 38 will cause the bevel gears 46 and 39 to rotate in the same direction. The bevel gear 39, which is in constant mesh with the bevel gear 90, will cause the bevel gear 90 to rotate in an opposite direction from the ring gear 58.

The outer end portion of hub 78 is provided with keyway 88. A clutch member generally indicated by the numeral 100 is keyed to the hub 78 by a key 102, the clutch member being capable of axial movement with respect to the hub 78 so as to selectively couple the sun gear 54 to the ring gear 58 or the bevel gear 90 as will be explained in more detail later in the specification.

Referring now to Figures 1, 4 and 5 the clutch member 100 includes a clutch collar 104, a ring element 106 encircling the clutch collar and a shifting rod 108 for shifting the ring element and clutch collar axially of the drive tube 26 and hub portion 78 of the sun gear 54. In more detail, clutch collar 104 is provided with oppositely disposed axially extending teeth 110 and 112, the teeth 110 extending axially toward the ring gear 58 whereas the teeth 112 extend axially toward the bevel gear 90. The hub portion 82 of ring gear 58 is provided with axially extending teeth 114 which are complementary to the teeth 110 of the clutch collar whereas the hub portion 95 of the bevel gear 90 is provided with axially extending teeth 116 which are complementary to the teeth 112 of the clutch collar. By shifting the clutch collar 104 to the left of Figure 1, the teeth 110 of the clutch collar will mesh with the teeth 114 of the ring gear and, consequently, the sun gear is coupled directly to the ring gear so that the sun, planetary and ring gears rotate as a unit when the ring gear is being driven by the bevel gear 46 when the clutch collar 104 is in meshing engagement with the ring gear, the output to the drive tube 26 results in maximum speed and minimum torque.

On the other hand, if the clutch collar 104 is moved to the right of Figure 1, the teeth 112 of the clutch collar will mesh the teeth 116 on the hub portion 95 of bevel gear 90. In this instance, the gear 90 is rotating in an opposite direction from the direction of rotation of the ring gear 58, and, consequently the sun gear 54 will be rotated in an opposite direction to the ring gear thereby resulting in an output to the drive tube 26 of minimum speed and maximum torque. When the clutch collar is in the intermediate position shown in Figure 1 so that neither the teeth 110 or 112 are in mesh respectively with the teeth 114 and 116, the sun gear 54 is free to rotate relative either the ring gear 58 or the bevel gear 90. When the clutch collar is in this intermediate position, there is no positive drive to the drive tube 26 even though the motor 42 is operating to rotate the stub shaft 38 and the bevel gears 39 and 46. In other words, when the clutch member 100 in the intermediate position as presently described and a load is applied to the drilling bit (not shown), the drilling bit will not rotate or advance since the sun gear is free to rotate relative the ring gear.

Referring now to Figure 7, it will be noted that the teeth 110, 112, 114 and 116 are beveled on one side as indicated at 117 so as to provide rotation of clutch collar 104 in one direction depending upon its engagement with the ring gear 58 or the bevel gear 90. When the clutch collar 104 is moved to the left of Figure 7 and the teeth 110 and 114 are in mesh, the clutch collar 104 can only be driven by the ring gear 58 in the direction of the arrow B. If the ring gear 58 is driven in a reverse direction, then the bevel 117 of teeth 110 and 114 will cause the clutch collar to slip and be disengaged. Likewise, when the clutch collar 104 is moved to the right of Figure 7 so that teeth 112 and 116 are in mesh, it will be driven in the direction of the arrow C by the bevel gear 90 which rotates opposite the ring gear 58. However, should the rotation of bevel gear 90 be reversed, the clutch collar will be disengaged because of bevel provided on the teeth 112 and 116.

As just previously mentioned, the clutch member 100 when intermediate the ring gear 58 and the bevel gear 90 provides no drive for the drive tube 26 as the sun gear 54 is free to rotate relative either the ring gear 58 or the bevel gear 90. While the clutch member is in this intermediate position, means are provided for selectively locking the sun gear against rotation in one direction so that an intermediate speed and torque is transmitted to the drive tube 26 as will now be described.

It will be noted in Figures 1, 4 and 5 that the ring element 106 is made in two sections bolted together as indicated at 120 and provides a channel 122 in which the outer periphery of the clutch collar is encased. Normally, the clutch collar is free to rotate relative the ring element 106 and when the clutch collar is rotating relative this element, the sun gear will be driven either by the ring gear or the bevel gear, or it will be free to rotate relative either the ring gear or the bevel gear. Ring element 106 is provided with a radially extending tubular extension 124 having an eye 126 therein through which passes the shifting lever 108. Snap rings 128 lock the shifting rod 108 in the eye 126 of the extension 124 so that axial movement of the shifting rod will transmit axial movement to the clutch member 100. The outer end of shifting rod 108 extends through the top wall 14 of the housing 16. A tubular member 130 welded to the housing 16 provides a support for a bushing 132. A suitable O-ring 134 carried by the stem of the shifting rod 108 provides a seal so that oil cannot leak from within the housing along the shifting rod 108.

The extension 124 is provided with a radially movable member 136, the member 136 being provided with a ring 138 having a larger inside diameter than the diameter of the shifting rod 108. Ring 138 of the movable member 136 is provided with an inwardly extending cam follower 140 which rides on the surface of the shifting rod 108. As best shown in Figure 5 the shifting rod 108 in the area of the ring 138 is provided with a cam surface 142 so that when the shifting rod is rotated substantially 90° on its longitudinal axis, the member 136 can move radially inwardly when the cam follower contacts the cam surface 142. A spring 144 provided in a bore 146 normally urges the cam follower 140 into engagement with the surface of the shifting rod 108. Thus, it is now evident that when the shifting rod is rotated on its axis to a position where the cam surface 142 is engaged by the cam follower 140, the movable member 136 will move radially inwardly.

A key 148 is provided on the inner end of the movable member 136, the key being beveled on one side, as indicated at 149. A keyway 150 provided in the outer periphery of the clutch collar 104 is adapted to receive the key 148 when the shifting rod 108 is rotated to a position where the movable member 138 can move radially inwardly. When the key 148 engages in the keyway 150 the clutch collar 104 is locked against rotation in the direction of the arrow A in Figure 5, and since the clutch collar is keyed to the hub 78 of the sun gear 54 by the key 102, the sun gear is also locked against rotation in this direction. Thus, when the key 148 is in this position and the ring gear 58 is rotating in a direction to advance the boring bar 28 and drive a cutting tool, an intermediate speed and torque is transmitted to the drive tube 26 by means of the planetary mechanism 52. On the other hand, when the ring gear 58 is rotating in a direction to free the load from the cutting tool, the bevel 149 on key 148 permits rotation of the clutch collar 104 in an opposite direction to the arrow A.

Referring now to Figures 2, 3 and 4 it will be noted that the shifting rod 108 is provided on its outer end by a handle 152, the handle being used to either shift the rod axially or rotate the same so that the sun gear can be locked against rotation. In addition, the handle 152 is provided with a radially extending pin 154 adapted to ride in an axial slot 156 provided in the tubular member 130. Intermediate the ends of the slot 156 is a circumferentially extending slot 158 which permits the shifting rod 108 to be rotated 90° to a position permitting key 148 to lock the sun gear against rotation in one direction, but permits rotation in an opposite direction to free the load on the cutting tool, as heretofore explained.

The operation of the drilling machine 10 of the present invention may be described briefly as follows: The lower flange 24 of the drilling machine 10 is bolted, in the usual manner to a valve positioned on a main adjacent the position where the main is to be drilled. Assuming that a low speed and maximum torque is desired for advancement and rotation of a tool by the boring bar 28, the shifting rod 108 is pulled outwardly from the housing 16 to a position indicated as low in Figure 3. When in this position, the shifting rod 108 will have moved the clutch member 100 to the extreme right of Figure 1 so that the teeth 112 on the clutch collar 104 are in meshing engagement with the teeth 116 on the bevel gear 90. Since the bevel gear 90 is in continuous meshing engagement with the pinion gear 39, it will rotate the clutch collar 104 in an opposite direction to the direction of rotation of ring gear 58. The clutch collar when in the extreme right hand position of Figure 1 is capable of rotating relative to the ring element 106 because the shifting rod 108 supports the movable member 136 and its key 148 out of engagement with the keyway 150 on the periphery of clutch collar 104. Rotation of the bevel gear 90 in opposite direction to the ring gear 58 causes the sun gear 54 to rotate in an opposite direction to the ring gear. Such movement of the ring gear and sun gear relative to one another causes the planetary gears 56 to rotate as movement is imparted to the planetary gear carrier 64. This predetermined low speed of rotation and high torque developed by the drive tube 26 is imparted to the boring bar 28 through the feed mechanism coupling the drive tube to the boring bar.

Axial movement of the shifting rod 108 to its extreme left position, as viewed in Figures 1 and 3, causes the clutch member 100 to move to a position where the teeth 110 of the clutch collar 104 are in meshing engagement with the teeth 114 provided on the hub 82 of ring gear 58. In this position, the clutch collar 104 is still free to rotate relative to the encircling ring 106. By moving the clutch collar to the position where the teeth 110 and 114 are in meshing engagement, the ring gear 58 and the sun gear 54 are effectively locked to one another so that when the ring gear is rotated, the sun gear also rotates in the same direction. Rotation of the sun gear in the same direction as the ring gear 58 will cause the planetary gears 56 to orbit without rotation on their axes. The sun, ring and planetary gears rotate as a unit, thereby imparting a direct drive from the bevel gear 46 to the drive tube 26. In this position, the drive tube 26 is rotated at a maximum speed with a minimum torque.

Axial movement of the shifting rod 108 to an intermediate position such as shown in Figures 1 and 3 will cause the teeth 110 and 112 of the clutch collar 104 to be out of mesh with the teeth 114 and 116 respectively of the ring gear 58 and the bevel gear 90. Since the shifting rod 18 has not been rotated on its axis, it is still in the relative position shown in Figure 3 and, thus, the movable element 136 carried in radial extension 124 is in its outward position so that the key 148 cannot engage the keyway 150 on the surface of clutch collar 104. If the motor 42 is operating when the clutch member 100 is in the aforementioned intermediate position the clutch collar 104 is free to rotate relative the encircling ring element 106 and, thus, the sun gear 54 can rotate in either direction relative to the ring gear 58 or the bevel gear 90. Because the sun gear is free to rotate relative the ring gear 58, the unit is in an effective neutral position as any load applied to the drilling tool will prevent the drilling tool from rotating since there is no fixed movement of the sun gear with respect to the ring gear 58. In other words, should the ring gear 58 be rotating, the planetary gear carrier 64 will not rotate if a load is applied through the boring bar 28 and drive tube 26 as the sun gear 54 is free to rotate and, therefore, the planetary gears 56 will merely rotate on their own axes and will not orbit about the axis of the sun gear.

If it is desired to provide a speed to the boring bar 28 intermediate the maximum and minimum speed, the shifting rod 108, when in the intermediate position, is rotated on its own axis approximately 90°. The pin 154 carried by the shifting rod will ride in the slot 158 and because the shifting rod is provided on its inner end with a cam surface 142, the cam surface will permit the pin 140 to follow the same in a direction which will cause the movable member 138 and its key 148 to move inwardly until it engages the keyway 150. When the key enters the keyway 150 the clutch collar 104 is effectively locked against rotation relative to the housing and, thus, the sun gear is locked against rotation relative to the housing. By holding the sun gear 54 stationary with respect to the housing the planetary gears must rotate on their own axis as they orbit when the ring gear is rotated, and an intermediate output speed of rotation is imparted to the planetary gear carrier 64. This intermediate output speed and torque is transmitted to the drive tube 26 and the boring bar 28.

From the foregoing description, it will now be evident that the planetary transmission of the present invention, embodied in a drilling machine, provides an improved mechanism of the device disclosed in my Patent No. 2,884,808. The invention provides a compact and efficient mechanism for obtaining a three-speed change to the rotation and axial displacement of the boring bar as well as a neutral position wherein no positive drive is transmitted to the boring bar while the air motor is operating. Because the design eliminates the movement of any bevel gears, which tend to develop considerable end thrust, into or out of mesh, it is not necessary to provide locking means to lock the transmission in various speed positions. The unit provides a compact transmission which has durability for rough operation encountered in present-day drilling and tapping of large mains and pipes.

It is now apparent that the objects of the present invention enumerated heretofore have been fully and effectively accomplished. The foregoing specific embodiment shown and described illustrates only the principle of the invention and certain modifications to the specific embodiment shown and described may be made without departing from the scope of the invention. Therefore, the terminology used in this specification is for the purposes of description and not limitation, the scope of the invention being defined in the claims.

I claim:

1. A transmission for effecting variable speed to a rotatable shaft comprising: a housing; a planetary gear mechanism disposed within said housing, said planetary gear mechanism including a sun gear rotatably mounted on the shaft, a gear carrier fixed to the shaft, at least one planet gear carried by said gear carrier and continuously meshing with said sun gear, a ring gear continuously meshing with said planet gear; a rotatable element shiftable axially of and rotationally fixed to said sun gear; a second rotatable element rotatable on the axis of said sun gear; means to rotate said ring gear and said second rotatable element in opposite directions; means to couple said first rotatable element to said ring gear for rotation therewith when said first rotatable element is shifted to one position thereby causing said ring gear and said sun gear to rotate as a unit; means to couple said first rotatable element to said second rotatable element when said first rotatable element is shifted to another position thereby causing said sun gear to rotate in an opposite direction with respect to said ring gear; and means to lock said first rotatable element against rotation when the same is shifted to a position intermediate said ring gear and said second rotatable element thereby locking said sun gear against rotation with respect to said ring gear and said second rotatable element.

2. The structure defined in claim 1 including means operable upon release of said locking means to permit said first rotatable element and said sun gear to rotate freely with respect to said ring gear and said second rotatable element.

3. A transmission for effecting variable speed to a rotatable shaft comprising: a housing; a planetary gear mechanism disposed within said housing, said planetary gear mechanism including a sun gear rotatably mounted on the shaft, a gear carrier fixed to the shaft, at least one planet gear carried by said gear carrier and continuously meshing with said sun gear, a ring gear continuously meshing with said planet gear; a gear element rotatably mounted on the shaft; means to continuously rotate said ring gear and said gear element in opposite directions; a rotatable element fixed to and shiftable axially of said sun gear, means to couple said rotatable element to said ring gear when in one position on said sun gear to thereby lock said sun gear to said ring gear for rotation as a unit; means to couple said rotatable element to said gear element when in another position with respect to said sun gear to thereby rotate said sun gear in a direction opposite rotation of said ring gear; and means effective when said rotatable element is intermediate its first and second position to thereby permit said rotatable element and said sun gear to freely rotate with respect to said ring gear and said gear element whereby the shaft may remain stationary while the ring gear and gear element are being driven.

4. In a drilling machine having a rotatably movable boring bar, a transmission mechanism for providing differential rotation speeds to the boring bar comprising: a rotatable shaft adapted to be operatively coupled to the boring bar for effecting rotatable movement thereto; a planetary gear mechanism for imparting rotary movement to said shaft, said planetary gear mechanism including a sun gear rotatably mounted on said shaft, a gear carrier fixed to said shaft, at least one planet gear carried by said gear carrier and meshing with said sun gear, and a ring gear meshing with said planet gear; a gear element rotatably mounted on said shaft, prime mover means cooperating with said ring gear and with said gear element to rotate said ring gear and said gear element in opposite directions; a clutch collar coaxially mounted with respect to said shaft and fixed against rotation with respect to said sun gear, said clutch collar being movable axially with respect to said sun gear; means to move said clutch collar axially of said sun gear to selectively couple said ring gear and said gear element to said sun gear whereby said sun gear is driven as a unit with said ring gear and opposite to said ring gear respectively, said last mentioned means being capable of moving said clutch collar out of engagement with said ring gear and said gear element whereby said sun gear rotates freely with respect to said ring gear and said gear element.

5. The structure defined in claim 4 wherein said means moving said clutch collar axially includes means to lock said clutch collar against rotation whereby said sun gear is locked against rotation in either direction.

6. The structure defined in claim 4 wherein said clutch collar is provided with teeth on opposite sides thereof, said teeth being adapted to alternatively engage complementary teeth provided on said ring gear and said gear element respectively.

7. The structure defined in claim 4 wherein said means moving said clutch collar axially includes a ring encircling said clutch collar and freely rotatable with respect thereto, said ring being fixed axially to said clutch collar, a shifting rod operatively connected to said ring element for shifting said ring element and said clutch collar axially of the shaft.

8. The structure defined in claim 7 including means to lock said ring element to said clutch collar when said clutch collar is out of engagement with said ring gear and said gear element, said last mentioned locking means locking said clutch collar against rotation whereby said sun gear is locked against rotation with respect to said ring gear and said gear element.

9. In a drilling machine having a rotatably moving boring bar, a transmission comprising: a housing; a rotatable shaft operatively coupled to the boring bar for effecting rotatable movement thereto; a planetary gear mechanism mounted within said housing for imparting rotary movement to said shaft, said planetary gear mechanism including a sun gear rotatably mounted on said shaft, a gear carrier fixed to said shaft, at least one planet gear carried by said gear carrier and meshing with said sun gear, and a ring gear meshing with said planet gear, said ring gear being provided with a set of bevel teeth; a bevel gear rotatably mounted on said shaft; prime mover means including bevel gear means for continuously meshing with the bevel teeth of said ring gear and said bevel gear element to thereby rotate said ring gear and said bevel gear element in opposite directions; and clutch means provided intermediate said ring gear and said bevel gear, said clutch means being selectively operable to couple said ring gear to said sun gear and said bevel gear to said sun gear whereby a differential speed may be imparted to said shaft.

10. The structure defined in claim 9 wherein said clutch means includes a clutch collar fixed to said sun gear and movable axially with respect thereto, said clutch collar having teeth which selectively engage complementary teeth on said ring gear and said bevel gear.

11. The structure defined in claim 9 wherein said clutch means includes means to lock said sun gear against rotation with respect to said ring gear and said bevel gear.

12. The structure defined in claim 9 wherein said clutch means includes means to permit said sun gear to rotate freely with respect to said ring gear and said bevel gear.

13. In a drilling machine having a rotatably movable boring bar, a transmission comprising: a housing; a rotatable shaft operatively coupled to the boring bar for effecting rotatable movement thereto; a planetary gear mechanism mounted within said housing for imparting rotary movement to said shaft, said planetary gear mechanism including a sun gear rotatably mounted on said shaft and having an extended hub portion, a gear carrier fixed to said shaft, at least one planet gear carried by said gear carrier and meshing with said sun gear, and a ring gear meshing with said planet gear, said ring gear having an extended hub portion coaxially with the extended hub portion of said sun gear, said extended hub portion of said ring gear being provided with axially extending teeth; a rotatable element carried on said shaft and spaced axially from said ring gear, said rotatable element having axially extending teeth thereon facing the teeth on said ring gear and spaced therefrom; prime mover means for rotating said ring gear and said rotatable element in opposite directions; a clutch collar carried on the extended hub portion of said sun gear intermediate the hub portion of said ring gear and said rotatable element, said clutch collar being shiftable axially of and fixed against rotation with respect to said sun gear, said clutch collar having axially extending teeth complementary to the teeth provided on said ring gear and said rotatable element; and means to shift said clutch collar axially to a first position where it couples said ring gear to said sun gear, to an intermediate position, and to a third position where it couples said sun gear to said rotatable element.

14. The structure defined in claim 13 wherein said last mentioned means includes means to lock said clutch collar against rotation with respect to said housing whereby said sun gear is locked against rotation.

15. The structure defined in claim 13 wherein said last mentioned means includes means to lock said clutch collar against rotation with respect to said housing, said locking means including a ring element encircling said clutch collar and axially fixed with respect to the same, said clutch collar being rotatable with respect to said ring element and a shifting rod operatively connected to said ring element for shifting the same axially, said shifting rod being provided with cam means for actuating a cam follower into locking engagement between said clutch collar and said ring element.

16. The structure defined in claim 15 wherein said cam follower includes a key movable radially of said ring element and adapted to be received in a recess on the outer periphery of said clutch collar.

17. The structure defined in claim 13, wherein said last-mentioned means include means to lock said clutch collar against rotation with respect to said housing in one direction, said locking means including means to permit rotation of said clutch collar in an opposite direction.

18. The structure defined in claim 17, wherein said locking means includes a key carried by said housing and movable radially of said clutch collar, said clutch collar having a recess for receiving said key, and said key having one side beveled whereby it will cam out of said recess to permit rotation of said clutch collar in the opposite direction.

19. In a drilling machine having a rotatably moving boring bar, a transmission comprising: a housing; a rotatable drive shaft operatively coupled to the boring bar for effecting rotatable movement thereto; a planetary gear mechanism mounted within said housing for imparting rotary movement to said drive shaft, said planetary gear mechanism including a sun gear rotatably mounted on said drive shaft, a gear carrier fixed to said drive shaft, at least one planet gear carried by said gear carrier and meshing with said sun gear, and a ring gear meshing with said planet gear, said ring gear being provided with a set of bevel teeth; a bevel gear rotatably mounted on said drive shaft; prime mover means including bevel gear means for continuously meshing with the bevel teeth of said ring gear and said bevel gear element to thereby rotate said ring gear and said bevel gear element in opposite directions; and a clutch collar provided intermediate said ring gear and said bevel gear, said clutch collar being fixed to said sun gear and movable axially with respect thereto and having teeth which selectively engage complementary teeth on said ring gear and said bevel gear, said teeth on said clutch collar and complementary teeth on said ring gear and said bevel gear having beveled sides whereby said clutch collar can be driven in one direction when in selective engagement with said ring gear and said bevel gear.

References Cited in the file of this patent

UNITED STATES PATENTS 2,884,808    Mullen _____ May 5, 1959